D. T. Robinson,
Horse-Collar Machine.
Nº 64,448. Patented May 7, 1867.
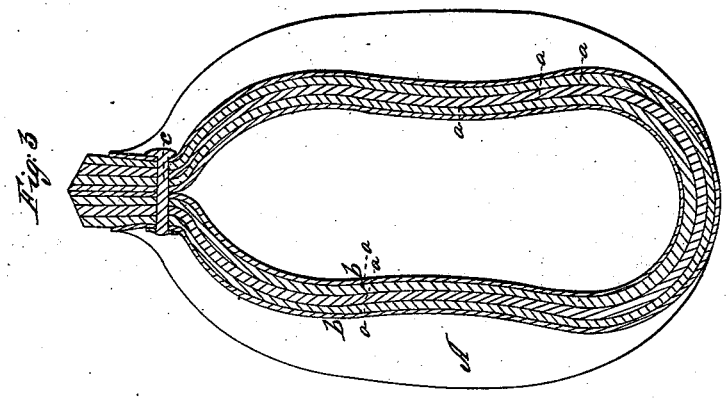
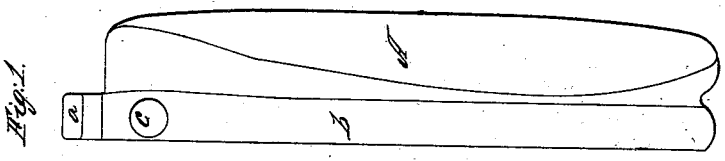
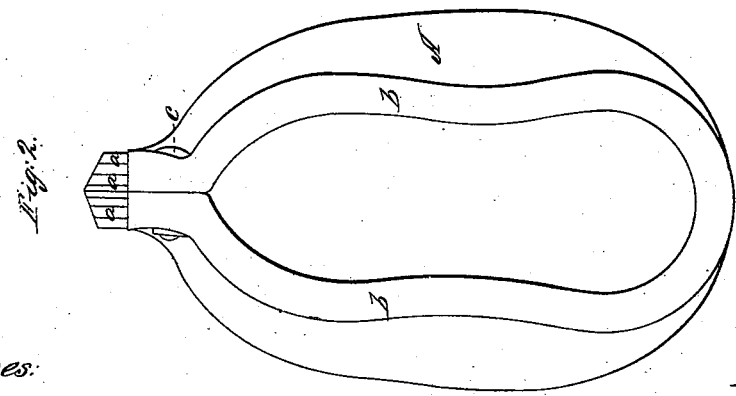
Witnesses:
Chas. L. Turner
Chas. H. Griffin
Inventor:
D. T. Robinson.
by his Attorney.
Frederick Curtis

United States Patent Office

DANIEL T. ROBINSON, OF BOSTON, MASSACHUSETTS.

Letters Patent No. 64,448, dated May 7, 1867.

IMPROVEMENT IN HORSE-COLLARS.

The Schedule referred to in these Letters Patent and making part of the same.

TO ALL WHOM IT MAY CONCERN:

Be it it known that I, DANIEL T. ROBINSON, of Boston, in the county of Suffolk, and State of Massachusetts, have made a new and useful invention relating to Horse-Collars; and do hereby declare the following to be a full, clear, and exact description thereof, reference being had to the accompanying drawings, making part of this specification, and in which—

Figure 1 denotes a side elevation.

Figure 2, a front elevation; and

Figure 3, a section of a horse-collar constructed in accordance with my invention.

In the construction of these collars heretofore the "roll" has been made of straw covered with leather, the ends being secured by stitching the ends of the leather together. As this is the only security against strain and wear of the collar, it frequently breaks away at this point, and is useless before being half worn out. It is also a matter of considerable dexterity and labor to "build up" or form the roll and apply it to the collar, and when done it possesses little if any elasticity.

My invention consists in constructing this "roll" of raw-hide, the advantages resulting from the use of this material being that it is very strong, easily formed into shape when soft, easily and quickly applied to the collar, is elastic to a considerable extent, and renders the collar very strong in its weakest part.

In the drawings above referred to A denotes the body or padded portion of the collar, the "roll" being shown as composed of several layers, $a\ a\ a$, &c., of raw-hide, covered with a sheet of leather, $b$, the ends of the strips of hide thus covered being secured firmly together by a rivet, $c$, passing through them, as shown in fig. 1. Previous to being applied to the collar the strips of hide are to be softened by any well-known means. In this state they are easily made to conform to the shape of the block, and while the collar is being made upon it, they, after being covered with leather, being secured to the body of the collar in the usual way.

In the manufacture of horse-collars, I claim forming the roll of strips or layers of raw-hide, arranged upon the collar, and secured together in the manner and for the purposes substantially as herein set forth.

DANIEL T. ROBINSON.

Witnesses:
CHAS. L. TURNER,
FREDERICK CURTIS.